J. ADDISON.
CAKE TURNER.
APPLICATION FILED SEPT. 7, 1915.
1,224,351.
Patented May 1, 1917.
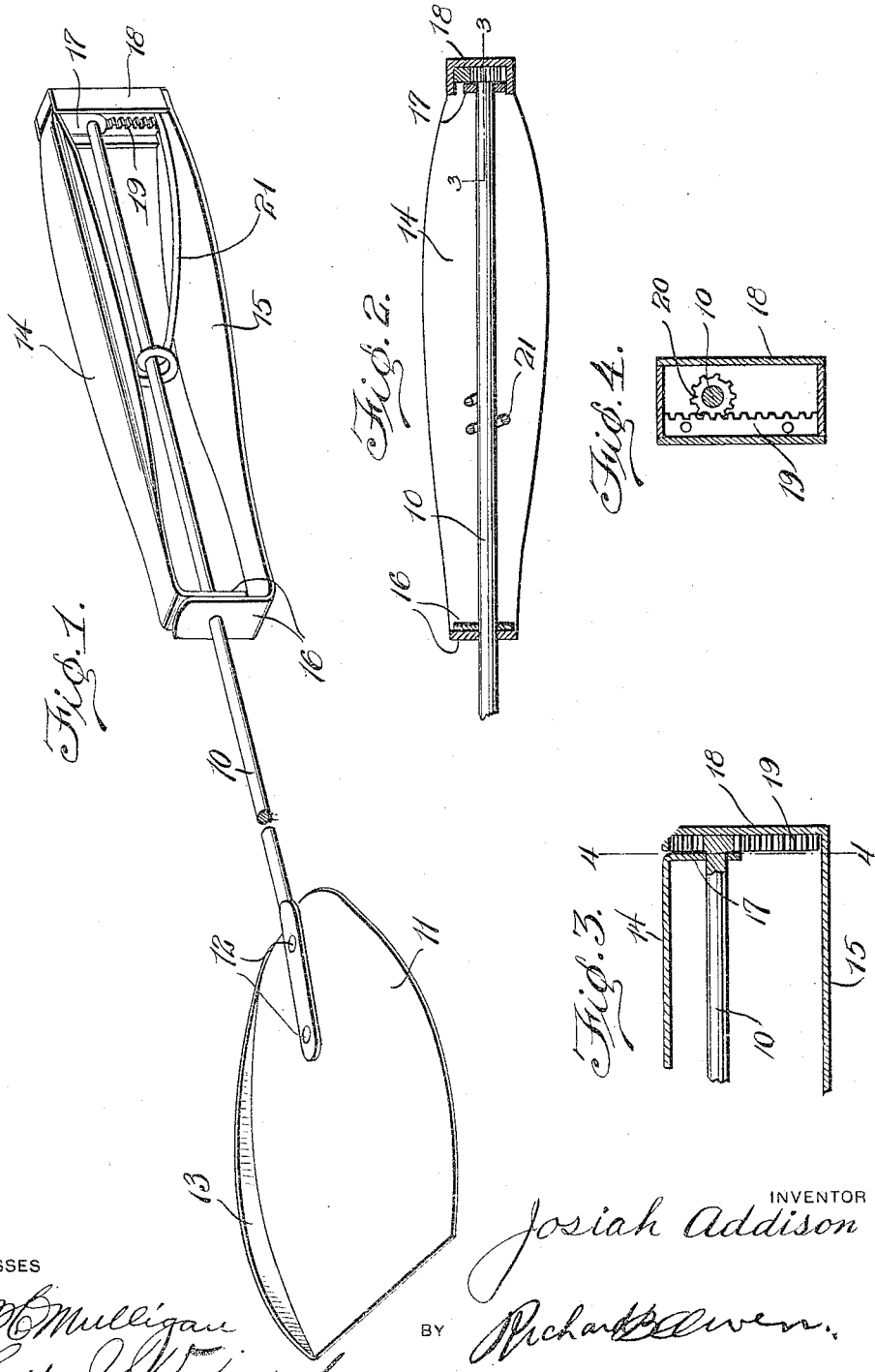
WITNESSES
INVENTOR
Josiah Addison
BY
ATTORNEY

UNITED STATES PATENT OFFICE.

JOSIAH ADDISON, OF BROUGHTON, ILLINOIS.

CAKE-TURNER.

1,224,351.  Specification of Letters Patent.  Patented May 1, 1917.

Application filed September 7, 1915. Serial No. 49,351.

*To all whom it may concern:*

Be it known that I, JOSIAH ADDISON, a citizen of the United States, residing at Broughton, in the county of Hamilton and State of Illinois, have invented certain new and useful Improvements in Cake-Turners, of which the following is a specification.

This invention relates to an improved cake turner and the principal object of the invention is to provide a cake turner so constructed that the blade may be caused to turn when pressure is applied to the handle carried by the shaft of the turner.

Another object of the invention is to provide an improved type of handle for the turner, the handle being formed of a plurality of leaves, one of which carries a rack for engaging a pinion carried by the shaft.

This invention is illustrated in the accompanying drawings, wherein:—

Figure 1 is a perspective view of the improved cake turner.

Fig. 2 is a fragmentary view showing the handle in section,

Fig. 3 is a sectional view taken along the line 3—3 of Fig. 2, and

Fig. 4 is a sectional view taken along the line 4—4 of Fig. 3.

The cake turner is provided with a shaft 10 which has one end portion flat and connected with the blade 11 by means of the rivets 12. This blade 11 is formed of sheet metal and if desired may be provided with a flange 13 so that when turning meat or other articles which are liable to slip off of the blade, the piece of meat will be engaged by the flange and thus prevented from slipping off of the blade.

The handle is provided with the two leaves 14 and 15 which have their inner end portions bent to form the tongue 16 through which the shaft passes so that the handle will be carried by the shaft. The leaf 14 has its outer end portion provided with a second tongue 17 and it will thus be seen that the leaf will rotatably mount the shaft. The leaf 15 terminates in a box or housing 18 in which there is mounted a rack 19 which meshes with a gear 20 carried by the handle. It will thus be seen that when the leaf 15 is moved toward and away from the shaft the shaft will be rotated through the medium of the rack and pinion and thus the blade caused to oscillate. In order to normally hold the blade 11 in the position shown in Fig. 1 there has been provided a spring 21 which has one end portion connected with the leaf 14 and is then coiled about the shaft and has its opposite end portion connected with the housing 18.

When in use the cake turner is grasped by the handle and the blade is slipped beneath the cake or other article which it is desired to turn. The turner is then raised a sufficient distance from the pan and pressure applied to the leaves 14 and 15 thus moving their free end portion toward the shaft. This causes the shaft to rotate and the cake will be turned and dropped upon the pan. Therefore the cake can be very easily lifted from the pan and turned and deposited in the pan.

What is claimed is:—

A cake turner including a shaft, a handle loosely mounted upon said shaft and having upper and lower leaves, a housing at the outer end of one leaf having a rear wall, an upper wall and side walls extending beyond and upon opposite sides of the upper wall, a tongue extending from the second leaf between the side walls and in front of the upper wall and provided with an opening through which the shaft extends, a rack in the housing beneath the upper wall and a gear carried by the shaft and engaging said rack.

In testimony whereof I affix my signature in presence of two witnesses.

JOSIAH ADDISON.

Witnesses:
H. A. WORLEY,
JOHN F. MARTIN.

Copies of this patent may be obtained for five cents each, by addressing the "Commissioner of Patents, Washington, D. C."